May 10, 1927.
W. E. BAXTER
1,627,880
AUTOMATIC HANDLE
Filed July 6, 1925    2 Sheets-Sheet 1
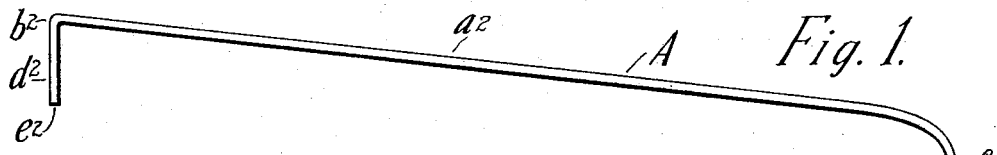
Fig. 1.
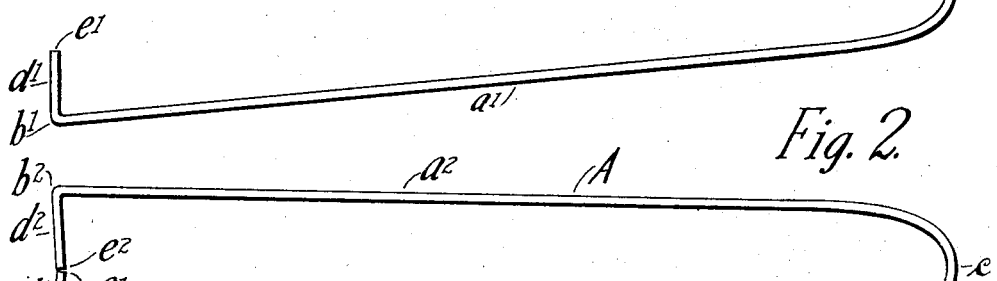
Fig. 2.
Fig. 3.
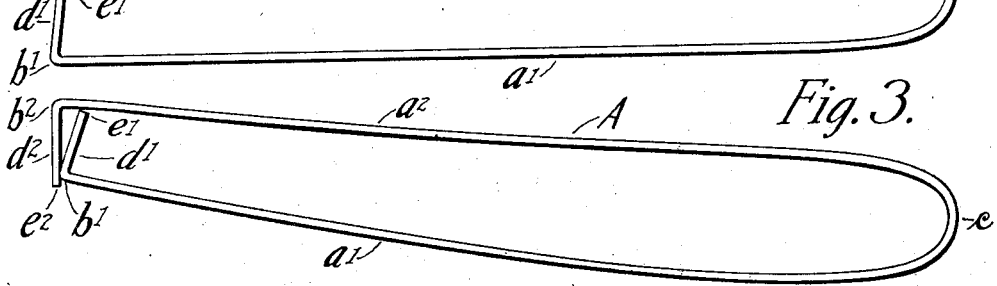
Fig. 4.
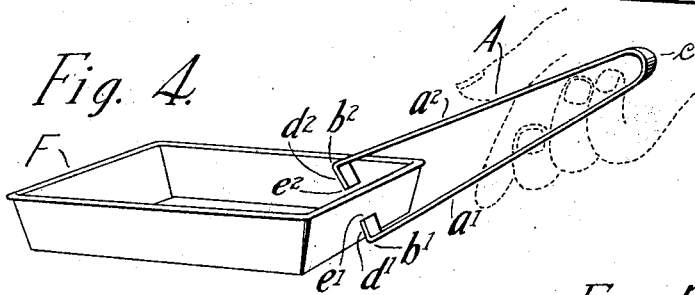
Fig. 5.
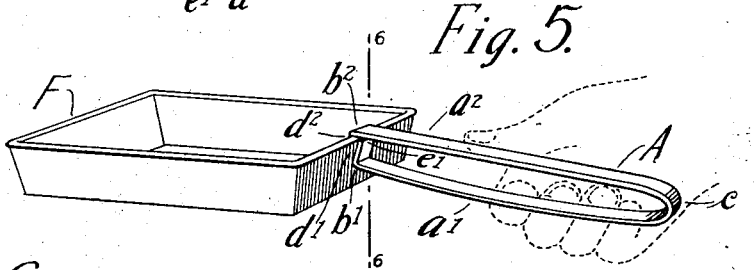
Fig. 6.
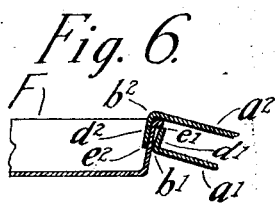
INVENTOR
William Edwardes Baxter.

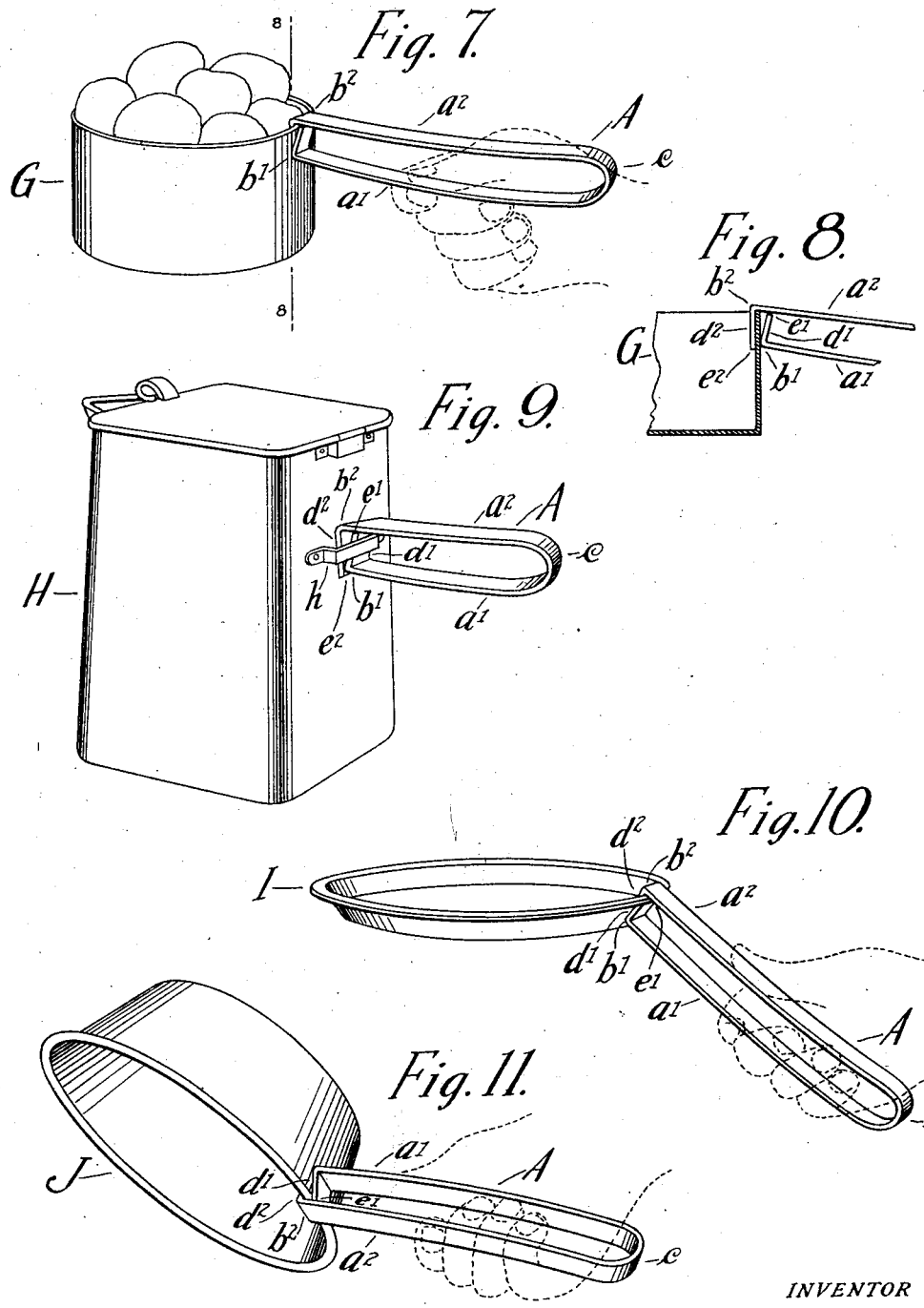

Patented May 10, 1927.

1,627,880

UNITED STATES PATENT OFFICE.

WILLIAM EDWARDES BAXTER, OF LOUISVILLE, KENTUCKY.

AUTOMATIC HANDLE.

Application filed July 6, 1925. Serial No. 41,815.

The handle can be used as a "pick up" in handling many objects; it serves as an attachable and detachable, close-packing handle of general utility for tourists' outfits; it is also for general and household use especially in handling cleansing and wiping-rags, containers, cooking utensils, plates and the like where and when coolness, cleanliness, compactness, efficiency and absolute and secure locked-attachment is desirable, or necessary especially in handling crucibles of molten metal, etc., all of which and that which follows will be more clearly understood by referring to the accompanying drawings in which like parts are indicated by like reference-symbols through the several views in which Figure 1 is a side elevation of the handle showing members thereof as formed; self held in true, at rest or free-alignment position.

Figure 2 is a side elevation of the handle showing active position or alignment of the handle's arms, and outward, members.

Figure 3 is a side elevation of the handle showing another active position—automatically locked-alignment of the handle's arms, and outward, members.

Figure 4 shows the handle (position as in Fig. 1) ready to contact with a wall of a cooking utensil.

Figure 5 shows the handle in a friction-gripping (always a semi-locked) position in relation to the cooking utensil.

Figure 6 shows a section along the line 6—6 of Figure 5.

Figure 7 shows the handle in automatic inter-locked-relation to the wall of a stewing kettle having no folded or wired rim.

Figure 8 shows a section along the line 8—8 of Figure 7.

Figure 9 shows the handle's deflected-members enclasped and automatically-locked upon themselves within the staple's opening of a nesting coffee-pot.

Figure 10 shows the handle as used for picking up and handling a pie pan, plate or a like, shallow article.

Figure 11 shows the handle in automatic inter-locked relation to a heavy cooking utensil in an inverted position, the hand not gripping the handle but only holding to one arm-member, $a^1$.

Referring to the drawings, the automatic handle herein described consists preferably of a strip of metal, A, formed into, or as of, nine (9) necessary parts or members thereof (or can be made up of metal parts, separate members, continuously connected) as illustrated in the several drawings and to be more fully described in detail; referring particularly to the drawing Figure 1, the curved-member appears at —$c$ and the arms-members appear at $a^1$ and $a^2$, and the bends-members appear at $b^1$ and $b^2$; and the deflected-members appear at $d^1$ and $d^2$, and the ends-members at $e^1$ and $e^2$. Figure 1, 2 and 3 are drawn to have the same horizontal axes as would appear as central of curve-member —$c$; and to have the same vertical axes as would appear as central of the Figures 1, 2 and 3, and thus aid in showing that the curve-member —$c$ alone maintains a rigid, unchanged position and relation while the changes here shown in the alignments of the handle and its members, are manifest in true outlines. The metal constituting the handle must be of a certain thickness and width and of the required quality necessary for the handle when not actively engaged to retain its true rest form of inactive outline, and by the aid of a slight hand pressure to assume a certain end-to-end outline of shape, and by an extra pressure of the hand to assume a friction-gripping outline of shape and by an extra added pressure of the hand to assume an interlocked outline of shape and maintain it unassisted by the hand, and when released from the interlocked outline, by a reversal of movement that caused it, then to readily and unfailingly regain its true form of inactive outline; this means that the curve-member —$c$, the bends-members $b^1$ and $b^2$, the deflected-members $d^1$ and $d^2$ and the ends-members $e^1$ and $e^2$ must always retain within themselves their rigid outlines as originally formed as herein mentioned, the arms-members $a^1$ and $a^2$ must not be concave, convex, reinforced or beaded but must always be forcefully resilient as within their own confines and in their combined resilient effectiveness to move and to hold the outward rigid members into an automatically-locked embrace or position; a strip of metal of the right quality and gauge selection will give both the rigid and the resilient qualities necessary, however, in using thin gauge metal for small, light weight handles I vertically bead the curve-member and likewise, vertically bead the bends-members and deflected-members to give extra rigidity when necessary.

The deflected-members ($d^1$ and $d^2$) as of the completed handle, voluntarily stand relatively apart; for general use I preferably reversely-bevel the end-to-end contacting-surfaces, see reversely-beveled ends, $e^1$ and $e^2$ Fig. 9; in true adjustment and accurate comparison of length the deflected-member $d^2$ must be longer than the deflected-member $d^1$ in order for the extra length of the longer member to act as a hook to lock over the bend-member $b^1$; the outwardly projecting convex surface of $b^1$ and the inwardly-inclined, hook-over surface of $d^2$ in combination with the action of the several other members are of noticeable importance.

Both deflected-members must deflect inwardly at the required acute-angles so that their ends-members stand apart properly aligned and so held by the rigid curve-member so that when pressure is brought to bear anteriorly on arms-members the ends-members are caused without extra direction to contact evenly—an end-to-end contact—desirable for handling objects other than containers. For reliable locking adjustment the longer deflected-member should not be over approximately ⅛ inch longer than the deflected-member $d^1$. A light hand-pressure will bring the ends-members into contact so that the reversely-beveled ends meet evenly and equally throughout their end-opposing surfaces, an added pressure will cause the longer deflected-member to slide forward and over the end-member $e^1$ and frictionally downward along the outer-surface of the shorter deflected-member and to slide over the outwardly projecting convex surface of the bend-member $b^1$ and snap into a hooked, locked, alignment therewith; the shorter deflected-member is automatically forced within the grasp of the longer deflected-member while the said deflected-member is sliding downward toward a locked position and the shorter deflected-member as of its end-member $e^1$ snaps or comes into a stopped, gauged alignment with the under side of the arm-member $a^2$, a certain spaced distance to the rear of the bend-member $b^2$, thus limiting the closure and completing a regulated, automatically locked and self-sustained alignment, see Fig. 3;—in this automatically-locked and fixed situation the downward deflection—the automatic bending out of line—of the resilient members $a^1$ and $a^2$ from their regular or at rest-form (Fig. 1) into constrained-form (Fig. 3) causes a rebound-effort resulting in an automatic pushing of the forceful arm-member $a^1$ made manifest by strong pressure of its bend-member $b^1$ against and within the hooked contacting part of the longer deflected-member; the constrained position also causes a rebound effort of the arm-member $a^2$ resulting in a firm hooking-action of the longer deflected-member over and against the contour surface of the bend-member $b^1$, which correlated but decidedly contrary efforts as exerted hold the parts securely and firmly in actual locked-alignment. The arms-members must be the only resilient ones, their inward and outward reaches must be bounded by the rigid members as herein set forth. A container is approached, see Fig. 4, so that by a slight hand pressure made on the handle arms will cause the end $e^2$ to contact with the container wall's inner surface and the end $e^1$ contact with the wall's outer surface, a stronger pressure will cause the parts to slide into interlocked relations with the intervening wall; this operation can be quickened:—simultaneously, with the hand pressure on the handle, make a lifting-motion and a quarter-rotating-motion, towards the operator, with the hand, the intervening wall acts as a wedge or fulcrum and combined with the hand pressure and the weight of the container causes the end $e^2$ to move forward and the end $e^1$ to move backward, through the resiliency of the arms-members, and both ends to instantly slide reversely along said intervening wall and to snap in an automatic, interlocked relation therewith. A semi-locked position caused by slight hand-pressure is shown in Fig. 5, and in a same scale, sectional view, Fig. 6, along line 6—6 Fig. 5; when the hand is removed therefrom the handle will remain attached to the cooking utensil in this semi-locked, gripping by friction, position but is somewhat readily dislodged therefrom; if more pressure of the operating hand is made upon the arms-members, the end $e^1$ is made to slide past the outer wired-rim of said wall and to snap into a full, automatically-gauged locked-alignment.

Having fully illustrated and described my invention I claim:

1. A lifter of the class described, comprising a strip of resilient material bent intermediate its ends to form handle members, said handle members being bent towards each other at their outer extremities to form gripping portions of unequal lengths whereby when the handle members are pressed towards each other the gripping portions are moved into interlocked relation, the longer of said portions overlapping the shorter.

2. A combined handle and "pick up" of the class described, comprising a strip of resilient material bent intermediate its ends to form handle members, said handle members commencing with the said intermediate bend as a rigid curve member but extending outward therefrom in the form of comparatively long, resilient members and being bent toward each other at their outer extremities to form comparatively short but stiff, gripping portions of unequal lengths having ends reversely beveled whereby when the resiliently controlled handle members are pressed toward each other the reversely beveled ends meet opposingly, and further pressure being used the gripping portions are moved into interlocked relation, the longer of said portions hooking over the shorter, the end of the shorter portion contacting against the inner side of the opposing resilient member all in combined action effecting an automatically locked, regulated and self-sustained alignment of the said members.

3. An automatically attachable, and detachable implement of the class described, comprising a strip of resilient material bent intermediate its ends to form handle members, said handle members being bent toward each other at their outer extremities to form gripping, interlocking portions of unequal lengths whereby, with the wall of a container or material intervening, when the handle members are pressed toward each other the ends of the gripping portions contact with and reversely slide against the said intervening wall and are moved into interlocked relation therewith and are automatically self-holding in the said inter-locked relation until automatically released therefrom then readily and unfailingly regain the inactive implement form substantially as and for the purposes set forth.

WILLIAM EDWARDES BAXTER.